Dec. 4, 1928.

J. P. COE 1,693,636

METHOD OF MAKING INNER TUBES

Filed Aug. 4, 1926

Inventor
JOHN P. COE
By his Attorney

Dec. 4, 1928.

J. P. COE 1,693,636

METHOD OF MAKING INNER TUBES

Filed Aug. 4, 1926    2 Sheets-Sheet 2

Inventor
JOHN P. COE

By his Attorney
Ernest Hopkinson

Patented Dec. 4, 1928.

1,693,636

UNITED STATES PATENT OFFICE.

JOHN P. COE, OF YONKERS, NEW YORK, ASSIGNOR TO G & J TIRE COMPANY, OF INDIANAPOLIS, INDIANA, A CORPORATION OF INDIANA.

METHOD OF MAKING INNER TUBES.

Application filed August 4, 1926. Serial No. 126,971.

This invention relates to the manufacture of inner tubes. More particularly it relates to a new method for transversely splicing substantially unvulcanized tubes.

In the making of inner tubes the ordinary methods of splicing, which consist in overlapping the ends of the tubes, are unsatisfactory in that the overlapped section is almost unavoidably of a greater thickness than the rest of the tube. Accordingly a short splice which would greatly reduce the area of uneven thickness, thereby also making for a saving in material, is very desirable. It has, however, been found very difficult to obtain a satisfactory short splice.

It is the object of this invention to provide a simple method for obtaining a strong short splice which will be economical both in material and time. A splice without a lap is particularly advantageous in drop center and well base rims which it is desirable to fit smoothly and without buckling.

According to this invention, unvulcanized rubber composition is rolled or extruded into tubular form of a length slightly in excess of that necessary to manufacture a complete tube. The opposite ends of the tube are then completely encircled with opposing endless members or mandrels which are each provided with a section removably secured in place in any suitable manner, as, for example, by being fashioned wedge-shaped or by being hinged to the remaining portion of each member. The ends of the tube protruding through the two members are turned back outwardly to form cuffs, the members are then moved toward each other until the cutting edges of the mandrels meet, welding or uniting the opposing surfaces of the stock at the same time that the excess material is sheared off. The scrap ends are removed and returned to the mill or tubing machine, thus avoiding any waste. The sections of the members are then removed or swung to one side and the tube thus completed in annular form is taken out and vulcanized.

The invention can best be understood if the following description is read in connection with the accompanying drawings, in which:—

Figure 2:
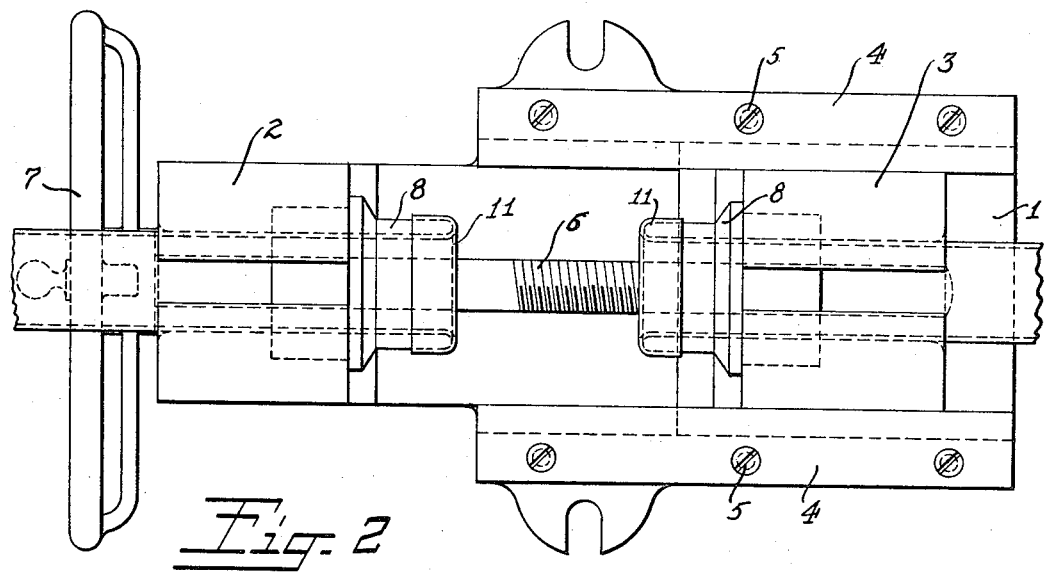
Fig. 2 is a top view of the device.
Figure 1:
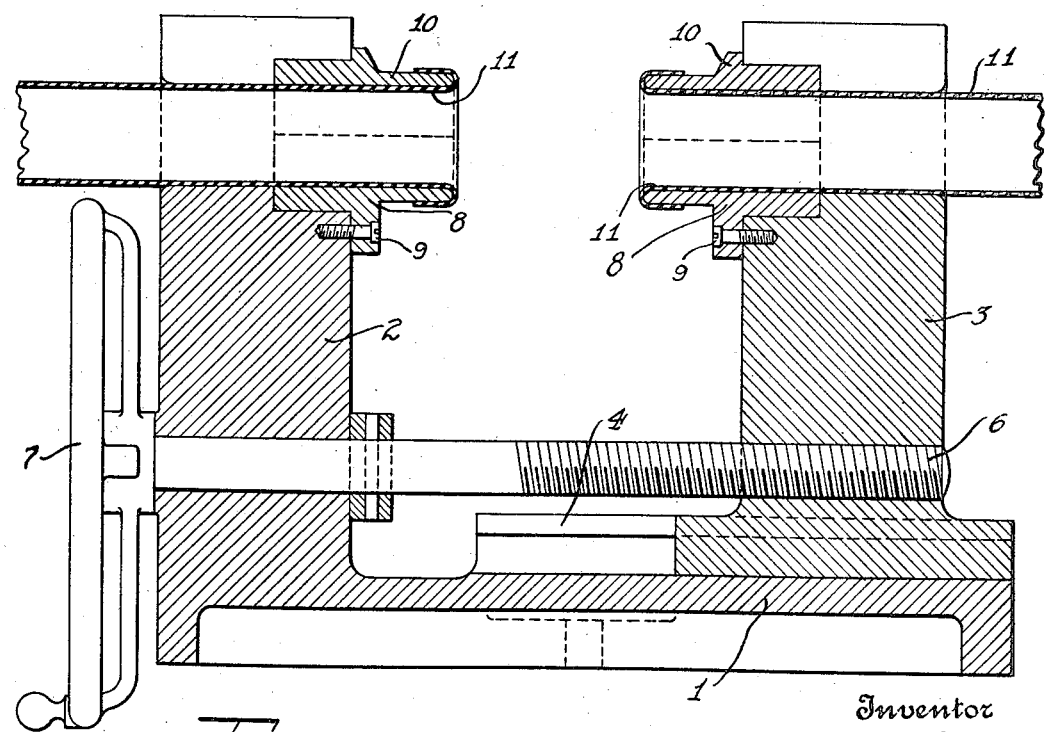
Fig. 1 is a longitudinal section showing the mandrels mounted in opposition in a press or vise which is in open position.

Referring first to Fig. 1, it will be seen that a pair of cutting dies or mandrels are mounted in opposition in a press or vise comprising the base 1, a stationary jaw 2, and a movable jaw 3. The movable jaw 3 is adapted to travel in the slideway which is formed by the plates 4 secured to the base by the bolts or rivets 5. A worm gear 6 is provided on which the movable jaw 3 may be caused to travel to or away from the stationary jaw 2 by operation of the wheel 7. The cutting dies or mandrels 8 are rigidly fixed in opposition in the two jaws of the vise by screws 9. Each mandrel is provided at the top with a removable section 10 permitting the completed tube to be removed from the enclosing form. The tubing 11 to be spliced is placed within the mandrels and the protruding ends turned back over the cutting ends of the dies. The wheel 7 is then operated causing the movable jaw 3 to move forward bringing the two cutting dies into contact, cutting off the turned back portions or cuffs and squeezing together the two ends of the tubing, thereby uniting it into an endless tube of annular form.

Figure 3:
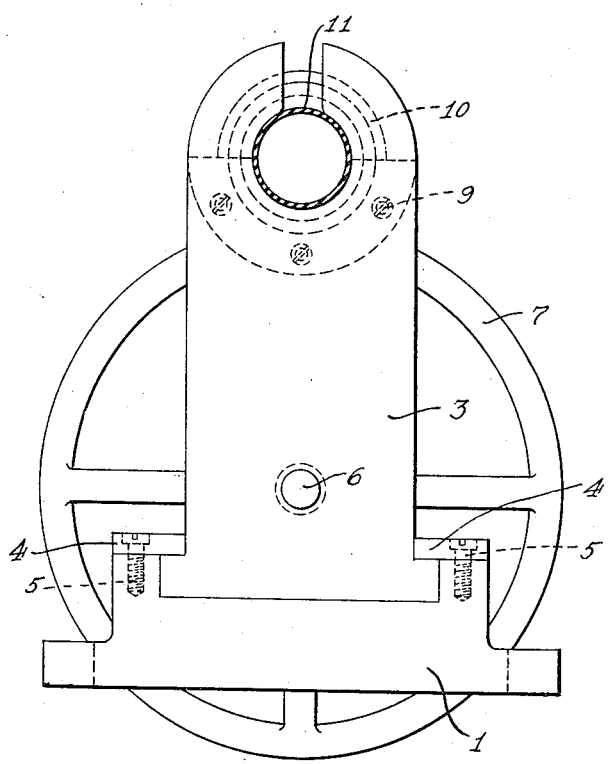
Fig. 3 is an end view showing the gap or opening in the top of the jaws of the vise through which tubing to be spliced may be introduced into the mandrels.
Figure 4:
Fig. 4 is a longitudinal section of the unvulcanized composition tubing in a position immediately before the ends are squeezed together.
Figure 6:
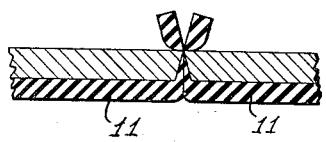
Fig. 6 is a longitudinal section showing a modified form of cutting die or mandrel.
Figure 7:
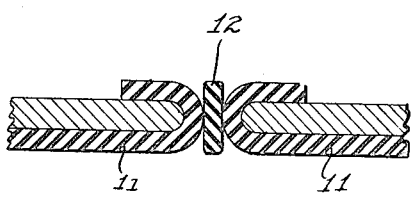
Fig. 7 is a longitudinal section showing a means of thickening the splice by introducing a strip of rubber between the ends of the tubing.

By reference to Fig. 3 it will be seen that a gap or opening is provided in the top of both the vise members 2 and 3 through which the tubing may be initially supplied to the mandrels. In the practice of this method for splicing tubes a pair of mandrels will be provided, perhaps 6" long, of the desired diameter, and with the cutting ends rounded or beveled or otherwise shaped, as desired. It has been found that if the cutting die or mandrel is thicker for the same thickness of rubber, the area subjected to the welding action is greater and a stronger seam results. The same thing can be accomplished by using a die with a flat beveled face, as shown in Fig. 6, or by increasing the thickness of the rubber at the seam by adding a strip, as shown in Fig. 7.

Figure 5:
Fig. 5 is a section similar to that shown in Fig. 4 showing a method of reinforcing the splice.

Fig. 5 is a longitudinal section of the vulcanized composition tubing illustrating how the seam may be reinforced if desired by wrapping strips of rubber around the tube at the point of union.

When the ends to be spliced are pressed together in the manner disclosed above the seam will be formed almost instantaneously. It has been found that some seams formed in this manner are definitely stronger than the rest of the tube wall without any further treatment after cutting.

In practice it may or may not be necessary, depending upon factory conditions, to clean the ends of the tubing with naptha, or other suitable fluid, before splicing. It may also be desirable to first dampen the ends of the cuff with benzol.

An inflating valve stem is built into the body of the unvulcanized tube in any convenient and well-known manner, preferably before uniting the ends. The completed tube is then placed in a mold filled with a fluid under pressure, such as inert gas, water, or steam, and vulcanized, or it may be vulcanized in a pan of talc or otherwise.

The method of splicing inner tubes disclosed in this application has the advantage of producing a seam which is mechanically very strong without being thicker than the rest of the tube except over a width equal to perhaps the thickness of the tube wall. It is therefore economical from the standpoint of material. It is very simple to perform and a splice may be made more quickly in this manner than by any other method now in use. It is applicable, furthermore, to tubes which are run from a tubing machine and which therefore do not have beveled or skived ends.

While one embodiment of the invention has been disclosed in detail in the foregoing paragraphs, various modifications, such as the use of roller shears to cut off the turned back cuffs of the tubing, will readily suggest themselves to those skilled in the art, and it is to be understood that the invention is to be limited only by the following claims.

Having thus described my invention, what I claim and desire to protect by Letters Patent is:—

1. The method of manufacturing an endless tube which comprises forming a length of tubing of unvulcanized rubber composition, turning the opposite ends of the tubing outwardly, and pressing the turned ends together to unite the same by adhesion.

2. The method of manufacturing an endless tube which comprises forming a length of tubing of unvulcanized rubber composition, turning the opposite ends of the tubing outwardly, and pressing the turned ends together to sever a portion of the turned ends and unite the remainder by adhesion whereby an endless tube is formed.

3. The method of manufacturing an endless tube which comprises forming a length of tubing of unvulcanized rubber composition, turning the opposite ends of the tubing back over the body of the tubing, bringing the annular turns of opposite ends into alignment, and pressing the turns together to sever the same and cause a portion thereof to adhere whereby an endless tube is formed.

4. The method of manufacturing an endless tube which comprises forming a length of tubing of unvulcanized rubber composition, turning the opposite ends of the tubing back over the body of the tubing, bringing the annular turns of opposite ends into alignment, and simultaneously severing the tubes at the turns and pressing the opposed severed ends together whereby they are caused to adhere.

5. The method of manufacturing an endless tube which comprises forming a length of tubing of unvulcanized rubber composition, turning the ends of the tubing, bringing the turned ends into alignment, pressing the turned ends together to sever the same and unite a portion thereof by adhesion thereby forming an endless tube, applying additional unvulcanized rubber composition to the tube at the union, and vulcanizing.

6. The method of manufacturing an endless tube which comprises forming a length of tubing of unvulcanized rubber composition, turning the ends of the tubing, bringing the turned ends into alignment, disposing additional unvulcanized rubber composition between the turned ends, pressing the turned ends together to sever the same and unite a portion thereof by adhesion thereby forming an annular tube, and vulcanizing.

7. The method of manufacturing an endless tube which comprises forming a length of tubing of unvulcanized rubber composition, turning the ends of the tubing, bringing the turned ends into alignment, disposing additional unvulcanized rubber composition between the turned ends, pressing the turned ends together to sever the same and unite a portion thereof by adhesion thereby forming an annular tube, applying additional unvulcanized rubber composition to the tube at the union, and vulcanizing.

8. The method of splicing tubes which comprises cuffing back each of a pair of tube-ends, pressing them together at the folds of the cuffs to form an annular seam, and trimming off the excess material by a cut extending along the seam.

9. The method of splicing unvulcanized rubber tubes which comprises pressing a pair of open tube ends together in registry with each other axially to form an annular seam end coalescing the rubber of the two tube-ends by pressing them together in the direction of their axes.

10. The method of splicing together the ends of a length of unvulcanized rubber tubing to form an annular tube which comprises cuffing back each of the tube-ends, pressing them together at the folds of the cuffs to form an annular seam, and by a continuation of the seaming pressure severing excess rubber from the exterior of the seam.

Signed at New York, county and State of New York, this 29th day of July, 1926.

JOHN P. COE.